United States Patent

Kobayashi et al.

[11] Patent Number: 5,890,363
[45] Date of Patent: Apr. 6, 1999

[54] BRAKE-PRESSURE PRODUCING DEVICE

[75] Inventors: Michio Kobayashi; Masahiro Shimada, both of Higashimatsuyama, Japan

[73] Assignee: Jidosha Kiki Co., Ltd., Tokyo, Japan

[21] Appl. No.: 966,715

[22] Filed: Nov. 10, 1997

[30] Foreign Application Priority Data

Nov. 20, 1996 [JP] Japan .................... 8-309214

[51] Int. Cl.⁶ .................................................. B60T 13/12
[52] U.S. Cl. ........................ 60/560; 60/552; 91/370
[58] Field of Search ........................ 60/547.1, 547.3, 60/551, 552, 553, 555, 557, 560, 574; 91/370, 372, 373

[56] References Cited

U.S. PATENT DOCUMENTS

| | | | |
|---|---|---|---|
| 3,894,390 | 7/1975 | Belart et al. | 60/552 |
| 4,592,599 | 6/1986 | Belart | 60/560 X |
| 4,642,989 | 2/1987 | Belart | 60/551 |
| 4,831,826 | 5/1989 | Belart et al. | 60/547.1 X |
| 5,081,841 | 1/1992 | Nishii | 60/560 |
| 5,735,124 | 4/1998 | Cords et al. | 60/560 X |

FOREIGN PATENT DOCUMENTS

| | | | |
|---|---|---|---|
| 3215954 | 11/1983 | Germany | 60/547.1 |
| 2180899 | 4/1987 | United Kingdom | 60/547.1 |

*Primary Examiner*—John E. Ryznic
*Attorney, Agent, or Firm*—Kanesaka & Takeuchi

[57] ABSTRACT

In a brake-pressure producing device of the present invention, a power piston 10 of a hydraulic booster 2 comprises a stepped piston including a large-diameter portion 10a on which fluid pressure of a power chamber 30 is exerted and a small-diameter portion 10b having the same diameter as the master cylinder piston 53. Both the pistons 10, 53 are interlocked with each other through an aligning rod 62. The pressurized fluid of the power chamber 30 is introduced into an annular chamber 51 formed on the circumference of the small-diameter portion 10b and the fluid pressure of the pressurized fluid is exerted on a stepped portion 10c between the large-diameter portion 10a and the small-diameter portion 10b in the direction opposite to the direction of the fluid pressure of the power chamber 30. When the braking operation is performed, the fluid pressure in the power chamber 30 introduced into wheel cylinders 33, 34 relating to one of the circuits and the master cylinder pressure introduced into wheel cylinders 58, 59 relating to the other circuit balance to be equal to each other, thereby uniformly and properly distributing braking forces to the respective wheel cylinders.

2 Claims, 5 Drawing Sheets

BRAKE-PRESSURE PRODUCING DEVICE

BACKGROUND OF THE INVENTION

The present invention relates to a brake-pressure producing device employing a hydraulic boosting device which boosts leg-power exerted on a brake pedal to a predetermined value by pressurized fluid, and more particularly to a brake-pressure producing device used in a semi-full power brake system having two circuits one of which is supplied with master cylinder pressure developed in a master cylinder and the other one is supplied with power chamber pressure introduced in a power chamber of a hydraulic boosting device.

A hydraulic boosting device used in a brake-pressure producing device of a vehicle can provide sufficient braking force with small leg-power on the brake pedal, thereby ensuring positive operation of the brakes and reducing the driver's labor.

In such a hydraulic brake system, it is desired to shorten the stroke of a brake pedal in view of its responsibility and operation. As one of conventional hydraulic boosting devices which can shorten the stroke of a brake pedal, proposed in Japanese Unexamined Patent Publication No. 63-247155 is a hydraulic boosting device used in a semi-full power brake system having two circuits one of which is supplied with master cylinder pressure developed in a master cylinder and the other one is supplied with power chamber pressure introduced in a power chamber of a hydraulic boosting device.

Figure 5:
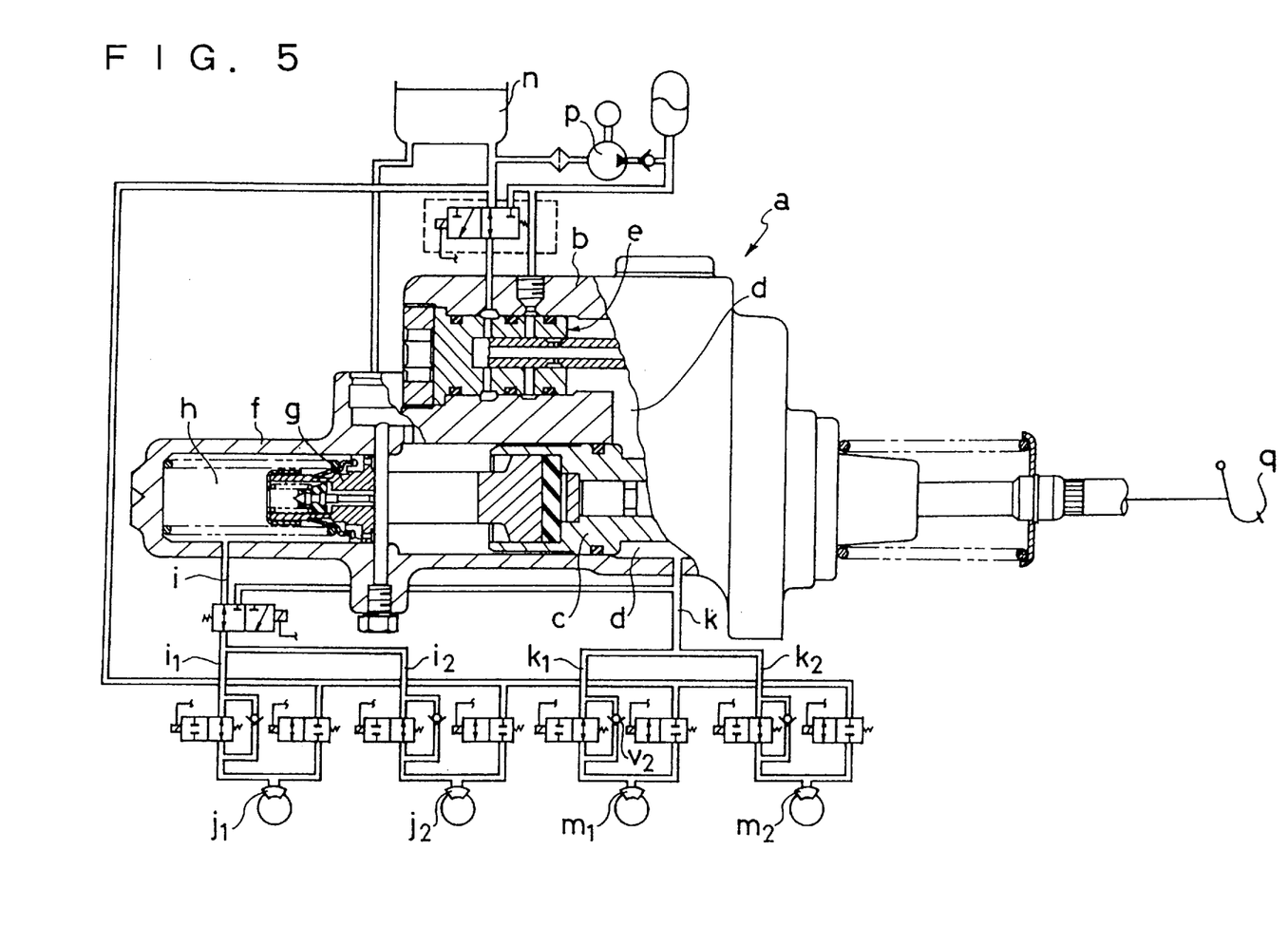
FIG. 5 is a view showing a conventional brake-pressure producing device.

FIG. 5 is a view showing the hydraulic boosting device disclosed in this publication. In this figure, mark "a" designates the hydraulic boosting device, "b" designates a hydraulic booster, "c" designates a power piston of the hydraulic booster b, "d" designates a power chamber of the hydraulic booster b, "e" designates a control valve of the hydraulic booster b, "f" designates a master cylinder, "g" designates a piston of the master cylinder f, "h" designates a fluid chamber of the master cylinder f, "i" designates a line for the one circuit which communicates with the fluid chamber h of the master cylinder f, "$i_1$" and "$i_2$"designate branch lines of the fluid line i for the one circuit, "$j_1$"and "$j_2$" designate wheel cylinders relating to the one circuit which are connected to the branch lines $i_i$ and $i_2$, respectively, "k" designates a line for the other circuit which communicates with the power chamber d of the hydraulic booster b, "$k_1$" and "$k_2$" designate branch lines of the fluid line k for the other circuit, "$m_1$" and "$m_2$" designate wheel cylinders relating to the other circuit which are connected to the branch lines $k_1$ and $k_2$, respectively, "n" designates a reservoir, "p" designates a hydraulic pump, and "q" designates a brake pedal.

In the hydraulic boosting device a, in the inoperative state i.e. when the brake pedal q is not pedaled, the control valve e which is in the inoperative position shuts off the power chamber d from the hydraulic pump p and communicates the power chamber d with the reservoir n. Therefore, no fluid pressure is introduced from the hydraulic pump p to the power chamber d so that the hydraulic booster b does not operate and the master cylinder f also does not operate so as not to actuate brakes. As the brake pedal q is pedaled, the control valve e operates to shut off the power chamber d from the reservoir n and communicate the power chamber d with the hydraulic pump p. As a result of this, fluid pressure is introduced from the hydraulic pump p to the power chamber d so that the power piston c works and the hydraulic booster b outputs whereby the piston g of the master cylinder f moves so as to develop master cylinder pressure in the fluid chamber h.

The master cylinder pressure is introduced into the wheel cylinders $j_1$ and $j_2$ through the lines i, $i_1$, and $i_2$ so as to actuate the brakes relating to the one circuit. The fluid pressure introduced into the power chamber d from the hydraulic pump p is further introduced into the wheel cylinders $m_1$ and $m_2$ through the lines k, $k_1$, and $k_2$ so as to actuate the brakes relating to the other circuit.

By using such a hydraulic boosting device a, it is no longer necessary to use a tandem master cylinder for two circuits, thereby shortening the axial length of an assembly of the hydraulic booster b and the master cylinder f and thus shortening the stroke of the brake pedal q.

However, the conventional brake-pressure producing device a has a problem that there is difference between brake pressures relating to the one circuit and that relating to the other circuit because the diameter of the power piston c of the hydraulic booster b and the diameter of the piston g of the master cylinder f are set to be different from each other. Thus, because of the difference in the brake pressures, the braking forces for braking the vehicle are not properly distributed to the respective wheel cylinders so that optimal braking is not conducted. Particularly, when the wheel cylinder for the front-left wheel and the wheel cylinder for the rear-right wheel pertain to the one circuit and the wheel cylinder of the front-right wheel and the wheel cylinder of the rear-left wheel pertain to the other circuit, i.e. in a case of the so-called X-type piping, the braking forces even for both the front wheels are different so as not to provide balanced braking.

SUMMARY OF THE INVENTION

It is an object of the present invention to provide a brake-pressure producing device which can provide proper distribution of braking forces to have uniformity in brake pressures of wheel cylinders in two circuits.

In order to achieve this object, the present invention provides a brake-pressure producing device for two circuits comprising: an input shaft which is operated when braking operation is performed; a hydraulic booster having a control valve controlled by the input shaft, a power chamber into which the fluid pressure is introduced when the braking operation is performed and which communicates with brake cylinders relating to one of the two circuits, and a power piston which is actuated by the fluid pressure in the power chamber, the fluid pressure being discharged from the power chamber by the control valve when the braking operation is not performed, the fluid pressure being introduced into the power chamber when the braking operation is performed, the fluid pressure introduced into the power chamber being then introduced into the brake cylinders relating to the one circuit, and the hydraulic booster outputting according to the operation of the power piston by the fluid pressure in the power chamber; and a master cylinder having a master cylinder piston which is interlocked with the power piston by the output of the hydraulic booster, the master cylinder developing master cylinder pressure by the operation of the master cylinder piston and supplying the master cylinder pressure to brake cylinders relating to the other one of the two circuits, wherein the power piston is comprises a stepped piston including a large-diameter portion at one end on which the fluid pressure of the power chamber is exerted and a small-diameter portion at the end opposite to the end of the large-diameter portion, the small-diameter portion having the same diameter as the master cylinder piston, an annular stepped portion between the large-diameter portion and the small-diameter portion is a pressure receiving area on which the fluid pressure of the power chamber exerted in the direction opposite to the direction that the fluid pressure is exerted on the end of the large-diameter portion.

The present invention is characterized in that the housing of the hydraulic booster and the housing of the master cylinder and/or the power piston and the master cylinder piston are integrally formed.

In the brake-pressure producing device of the present invention as structured above, since the effective receiving area of the power piston on which the fluid pressure in the power chamber is substantially exerted is equal to the effective receiving area of the master cylinder piston where the master cylinder pressure in the fluid chamber is received in the while the power piston 10 and the master cylinder piston 53 are interlocked with each other, the fluid pressure in the power chamber to be introduced to the brake cylinders relating to the one circuit and the master cylinder pressure to be introduced to the brake cylinders relating to the other circuit balance to be equal to each other.

Therefore, the uniformity in brake pressure of all the brake cylinders is achieved so that the balanced and proper distribution of the braking forces to the wheels can be provided even when a X-type piping is used in the brake system, thereby properly performing the braking operation.

According to the present invention, the housing of the hydraulic booster and the housing of the master cylinder and/or the power piston and the master cylinder piston are integrally formed, with the result that the overall length of the assembly of the hydraulic booster and the master cylinder can be shortened and the number of parts can be reduced. This simplifies the structure of the assembly and reduces the cost.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
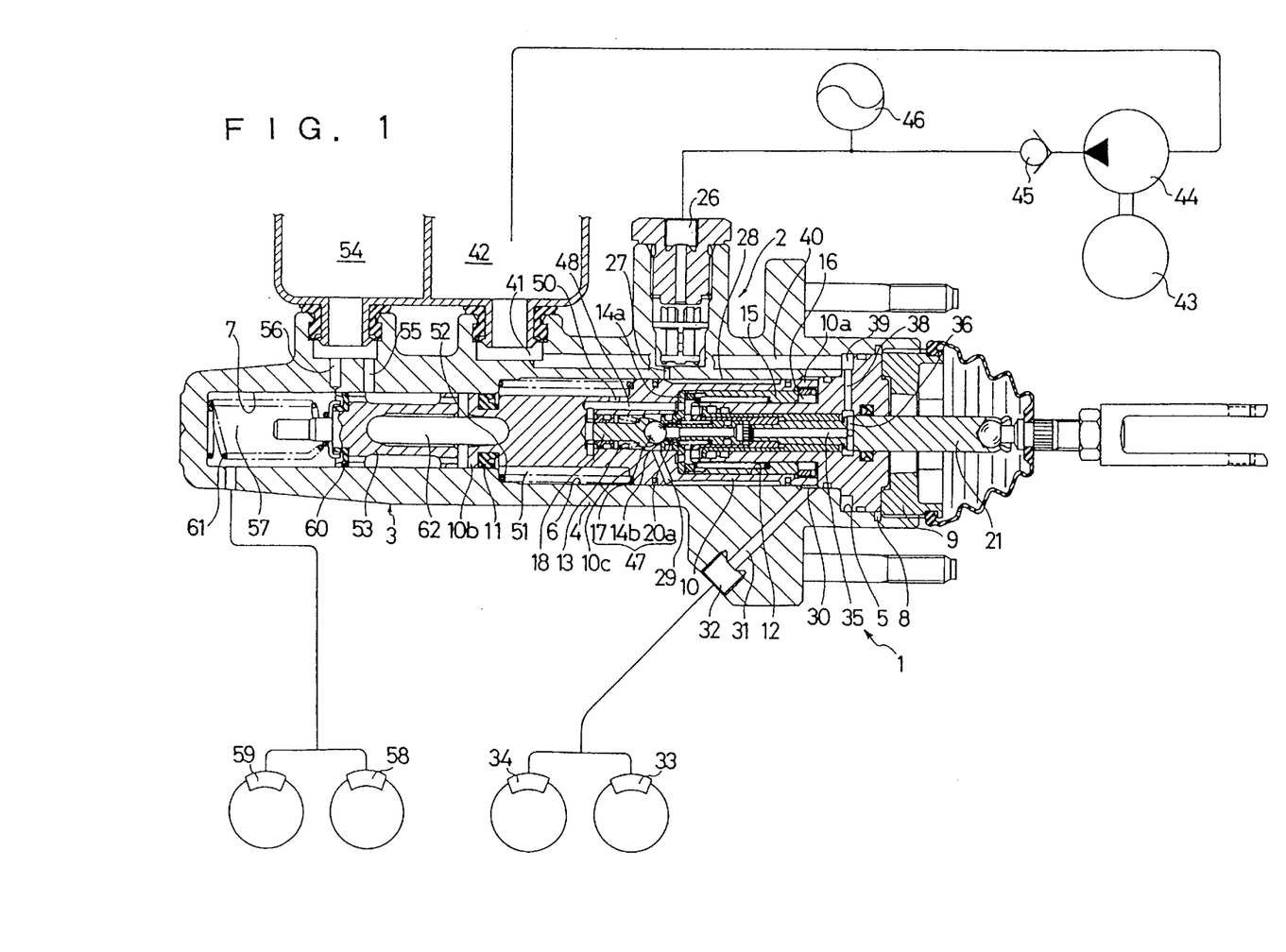
FIG. 1 is a sectional view showing one embodiment of a brake-pressure producing device in accordance with the present invention.
Figure 2:
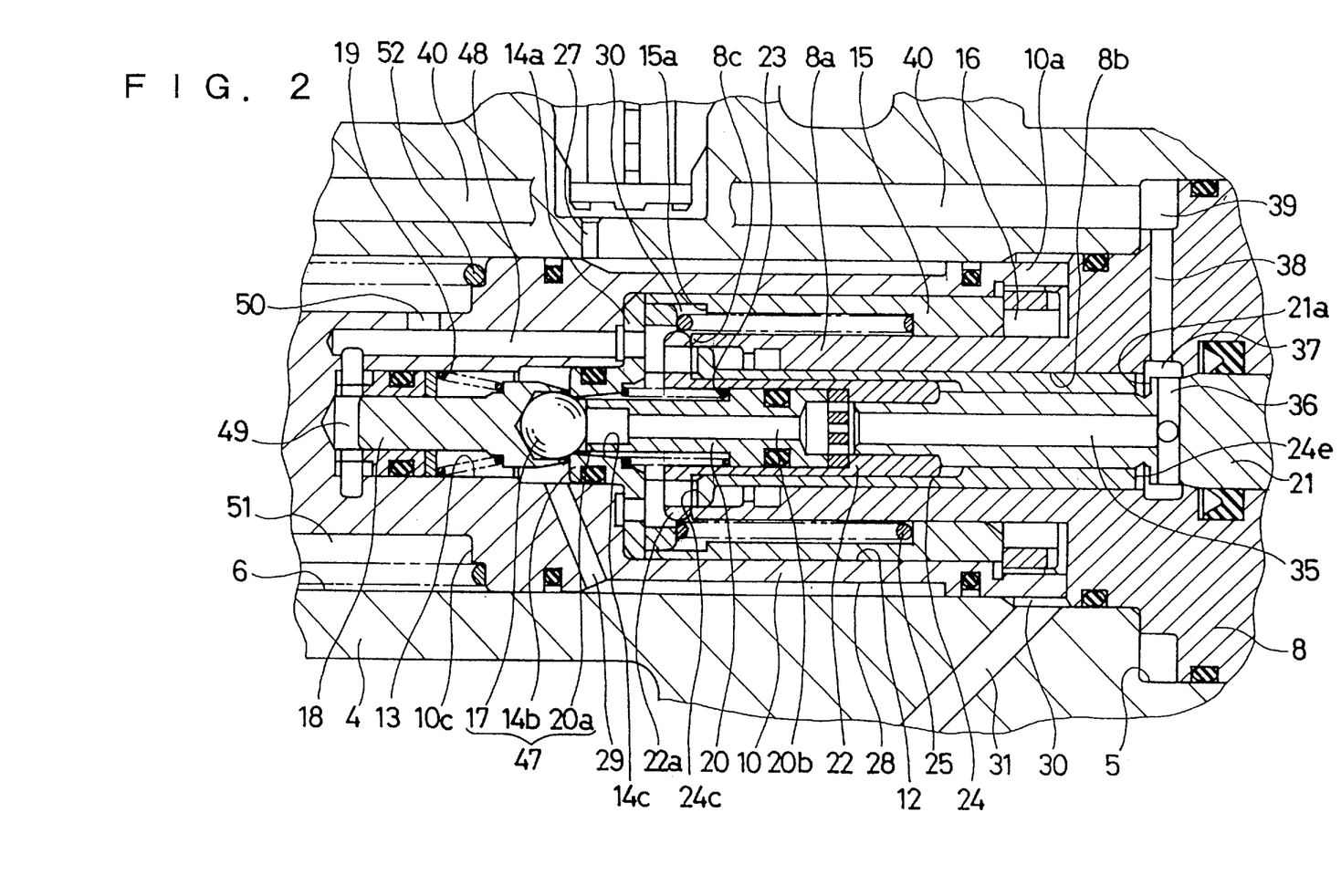
FIG. 2 is a partly enlarged sectional view of the brake-pressure producing device shown in FIG. 1.

FIG. 1 is a sectional view showing one embodiment of a brake-pressure producing device in accordance with the present invention and FIG. 2 is a partly enlarged sectional view of FIG. 1.

As shown FIG. 1 and FIG. 2, the brake-pressure producing device 1 of this embodiment comprises a hydraulic booster 2, a master cylinder 3 actuated by the output of the hydraulic booster 2, the hydraulic booster 2 and the master cylinder 3 being integrated, and a housing 4 which is common to the hydraulic booster 2 and the master cylinder 3.

As for the hydraulic booster 2, the housing 4 is provided with a first hole 5 opening toward the right hand side in FIG. 1, a second hole 6 continuously formed at the left side of the first hole 5, the diameter of the second hole 6 being smaller than that of the first hole 5, and a third hole 7 continuously formed at the left side of the second hole 6 and having a closed left end, the diameter of the third hole 7 being smaller than that of the second hole 6. The first, second, and third holes 5, 6, 7 are integrally formed as a stepped hole. The right end of the first hole 5 is hermetically closed by a plug 8 which is in contact with the stepped portion between the first hole 5 and the second hole 6 and is fixed to the housing 4 by a nut 9 threaded into the housing 4.

Disposed within the second and third holes 6, 7 and extending across them is a power piston 10 of the hydraulic booster 2 which is structured as a stepped piston comprising a large-diameter portion 10a at the right side thereof having substantially the same diameter of the second hole 6 and a small-diameter portion 10b at the left side thereof having substantially the same diameter of the third hole 7. The large-diameter portion 10a is sealed with O-rings and allowed to slide in the second hole 6 and the small-diameter portion 10b is sealed by a cup packing 11 and allowed to slide in the third hole 7. In this case, the cup packing 11 seals fluid only in one direction so as to prevent fluid from flowing from the second hole 6 toward the third hole 7 while allowing fluid to flow from the third hole 7 toward the second hole 6 between the small-diameter portion 10b of the power piston 10 and the inner wall of the third hole 7 of the housing 4.

The power piston 10 is provided with a fourth hole 12 opening at the right end of the power piston 10 and a fifth hole 13 formed continuously from the left end of the forth hole 12 and having a closed left end thereof, the diameter of the fifth hole 13 being smaller than that of the fourth hole 12. The fourth and fifth holes 12, 13 are integrally formed as a stepped hole. Hermetically disposed in the fifth hole 13 is a cylindrical valve seat member 14 which is fixed to the power piston 10 in such a manner that a flange 14a of the valve seat member 14 comes in contact with the stepped portion between the forth hole 12 and the fifth hole 13 by a nut 16 threaded into the right end of the power piston 10 through a cylindrical fixing member 15 inserted into the fourth hole 12. The cylindrical fixing member 15 is slidably fitted onto the circumference of a cylindrical projection 8a extending in the axial direction of the plug 8.

Slidably inserted into the fifth hole 13 is a valve body 18 supporting a valve ball 17. The valve body 18 is always biased by a spring 19 in such a direction that the valve ball 17 is seated in a first valve seat 14b of the valve seat member 14. The valve seat member 14 has an axial hole 14c in which a cylindrical member 20 is disposed. The cylindrical member 20 has a second valve seat 20a formed at the front end thereof in which the valve ball 17 is seated. The cylindrical member 20 is inserted into an axial hole of a cylindrical stopper 22 and is fixed to the cylindrical stopper 22 by a spring 23 compressed between the valve seat member 14 and the cylindrical member 20, the cylindrical stopper 22 being securely fitted onto the circumference of an input shaft 21 at the left end of the input shaft 21. The input shaft 21 and the cylindrical stopper 22 penetrate the cylindrical projection 8a of the plug 8 through the axial hole 8b and the rear end of the input shaft 21 is connected to a brake pedal which is not shown. The rearmost positions for the cylindrical member 20 and the input shaft 21 are defined by that a flange 22a of the cylindrical stopper 22 comes in contact with a front end 8c of the cylindrical projection 8a of the plug 8.

Figure 3:
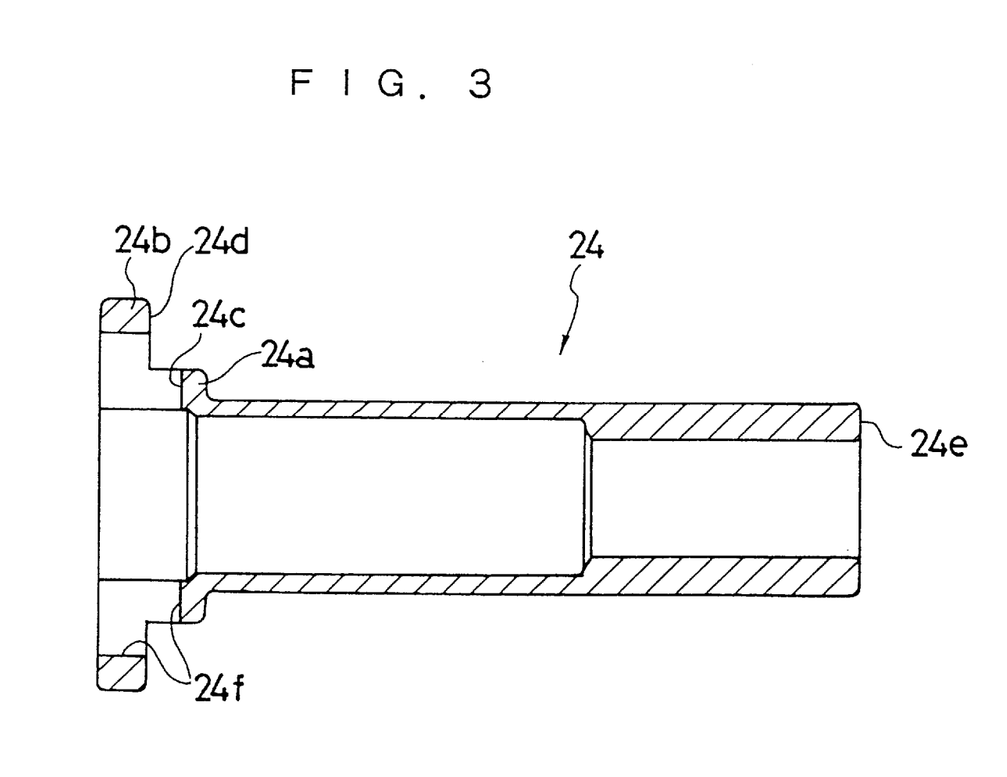
FIG. 3 is a sectional view showing in a detail a reaction piston of hydraulic booster shown in FIG. 1 and FIG. 2.

Slidably inserted between the outer peripheries of the input shaft 21 and the cylindrical stopper 22 and the inner periphery of the axial hole 8b of the cylindrical projection 8a of the plug 8 is a cylindrical reaction piston 24. As shown in FIG. 3, the reaction piston 24 is provided with a first flange 24a and a second flange 24b at the left end thereof in FIG. 3. Since the flange 22a of the cylindrical stopper 22 can come in contact with the left end of the first flange 24a, the left end of the first flange 24a at this point functions as a stopper 24c for preventing further backward movement of the cylindrical stopper 22 relative to the reaction piston 24.

The right end of the second flange 24b functions as an engagement member 24d which engages with a stepped portion 15a of the cylindrical fixing member 15 when the reaction piston 24 retreats to a predetermined extent relative to the power piston 10. The right end 24e of the reaction piston 24 can come in contact with a stepped portion 21a of the input shaft 21. Compressed between the second flange 24b of the reaction piston 24 and the cylindrical fixing member 15 is a spring 25 whereby the second flange 24b of the reaction piston 24 is normally in contact with the flange 14a of the valve seat member 14.

The housing 4 is further provided with an inlet 26 through which pressurized fluid is introduced and a path 27 allowing the communication between the inlet 26 and the second hole 6 and the power piston 10 is provided with an annular groove 28, which communicates with the path 27, formed in the circumference of the power piston 10 and a path 29 allowing the communication between the annular groove 28 and the fifth hole 13 at the valve body 18 side of the valve seat member 14. The inlet 26, the path 27, the annular groove 28, and the path 29 form together a fluid pressure supply passage.

A space in the second hole 6 defined between the plug 8 and the right end of the power piston 10 is a power chamber 30 which always communicates with the axial hole 14c of the valve seat member 14. The flange 22a of the cylindrical stopper 22 and the first and second flange 24a, 24b of the reaction piston 24 are positioned in the power chamber 30. Formed between the outer periphery of the cylindrical projection 8a of the plug 8 and the inner periphery of the cylindrical fixing member 15 is an axial groove (not shown) so as to allow free flow of hydraulic fluid on the both sides of the cylindrical fixing member 15. The power chamber 30 always communicates with an outlet 32 through a path 31 formed in the housing 4 and the outlet 32 always communicates with wheel cylinders 33, 34 relating to one of two braking circuits constituting the brake system.

Moreover, the axial hole 20b of the cylindrical member 20 opening to both the right and left sides always communicates with a discharge port 41 through an axial path 35 and a radial path 36 which are formed in the input shaft 21, an annular groove 37 and a radial path 38 which are formed in the plug 8, an annular space 39 formed between the plug 8 and the housing 4, and an axial passage 40 formed in the housing 4. The discharge port 41 always communicates with a booster reservoir 42 for the hydraulic booster.

Further, a hydraulic circuit connecting the inlet 26 and the booster reservoir 42 is provided with a hydraulic pump 44 driven by a motor 43 and an accumulator 46 at the discharge side of the hydraulic pump 44 via a check valve 45. Predetermined pressure is always stored in the accumulator 46 by the discharge pressure of the hydraulic pump 44.

In the inoperative state i.e. when the brake pedal is not pedaled, the valve ball 17, the valve seat member 14, and the front end 20a (the second valve seat) of the cylindrical member 20 are in positions as shown in FIG. 1 and FIG. 2. That is, the valve ball 17 is seated in the first valve seat 14b of the valve seat member 14 and the second valve seat 20a of the cylindrical member 20 is parted from the valve ball 17. In this state, while the communication between the path 29 always communicating with the inlet 26 and the axial hole 14c of the valve seat member 14 is interrupted, the communication between the axial hole 14c of the valve seat member 14 and the axial hole 20b of the cylindrical member 20 always communicating with the discharge port 41 is allowed. Therefore, in the inoperative state, the power chamber 30 is shut off from the pump 44 and the accumulator 46 and communicates with the booster reservoir 42 so that pressurized fluid is not supplied into the power chamber 30.

In the operative state i.e. when the brake pedal is pedaled, the input shaft 21 moves forward so that the valve ball 17 is seated in the second valve seat 20a of the cylindrical member 20 and the valve ball 17 is parted from the first valve seat 14b of the valve seat member 14. In this state, therefore, the communication between the path 29 and the axial hole 14c of the valve seat member 14 is allowed while the communication between the axial hole 14c of the valve seat member 14 and the axial hole 20b of the cylindrical member 20 is interrupted. That is, during the braking operation, the power chamber 30 communicates with the pump 44 and the accumulator 46 and is shut off from the booster reservoir 42 so that pressurized fluid is supplied into the power chamber 30.

In this manner, the valve ball 17, the first valve seat of the valve seat member 14 and the second valve seat of the cylindrical member 20 constitute together a control valve 47 for the hydraulic booster 2 for selectively switching the power chamber 30 to communicate with the pump 44 and the accumulator 46 or with the booster reservoir 42.

Furthermore, the power chamber 30 always communicates with a chamber 49 facing the left end of the valve body 18 through an axial path 48 formed in the power piston 10, and always communicates with an annular chamber 51 formed between the inner periphery of the second hole 6 of the housing 4 and the outer periphery of the small-diameter portion 10b of the power piston 10 through the path 48 and a radial path 50, extending from the path 48, formed in the power piston 10. The annular chamber 51 accommodates a return spring 52 which always biases the power piston 10 in a direction toward the inoperative position.

As for the master cylinder 3, this master cylinder 3 has the same structure as a general conventional single master cylinder. That is, a master cylinder piston 53 is slidably inserted into the third hole 7 of the housing 4. In addition, a master cylinder reservoir 54 is mounted on the housing 4 and the housing 4 is provided with a brake fluid supply port 55 and a compensating port 56 to communicate the master cylinder reservoir 54 with the third hole 7. Moreover, a fluid chamber 57 is defined in the third hole 7 by master cylinder piston 53 and always communicates with wheel cylinders 58, 59 relating to the other one of the two circuits. Mounted on the front end of the master cylinder piston 53 is a cup packing 60. When the cup packing 60 is in the inoperative position in the right side of the opening end of the compensating port 56, the fluid chamber 57 communicates with the master cylinder reservoir 54 so that master cylinder pressure is not developed in the fluid chamber 57. When the cup packing 60 of the master cylinder piston 53 then moves toward the left side of the opening end of the compensating port 56 and play in stroke for the wheel cylinders 58, 59 is canceled, the master cylinder pressure is developed.

By the way, in the brake pressure-producing device 1 of the hydraulic brake system of this embodiment, the effective receiving area of an annular stepped portion 10c between the large-diameter portion 10a and the small-diameter portion 10b of the power piston 10 is set to be dimensions given by subtracting the effective receiving area of the small-diameter portion 10b of the power piston 10 by the cup packing 11 from the effective receiving area of the power piston 10 to which the fluid pressure in the power chamber 30 is exerted while the effective receiving area of the small-diameter portion 10b of the power piston 10 by the cup packing 11 is set to be equal to the effective receiving area of the master cylinder piston 53 to which the master cylinder pressure is exerted. That is, the substantial receiving area of the power piston 10 to which the fluid pressure in the power chamber 30 is exerted is set to be equal to the effective receiving area of the master cylinder piston 53 on which the master cylinder pressure in the fluid chamber 57 of the master cylinder 3 is exerted.

Further, the master cylinder piston 53 is always biased to the right, i.e. in the direction toward the inoperative position by a return spring 61 and an aligning rod 62 is disposed between the power piston 10 and the master cylinder piston 53 whereby the both pistons 10, 53 are aligned and are allowed to be interlocked with each other.

In the brake-pressure producing device 1 of this embodiment as structured above, in the inoperative state i.e. when the brake pedal is not pedaled, the input shaft 21 does not move forward and the control valve 47 is thus in the inoperative state as shown in FIG. 1 and FIG. 2 as mentioned above. As a result of this, no pressurized fluid is supplied from the accumulator 46 to the power chamber 30 so that the power piston 10 does not operate and the hydraulic booster 2 does not output. Since the annular chamber 51 always communicates with the power chamber 30, no pressurized fluid is also supplied from the accumulator 46 to the annular chamber 51.

The right end 24e of the reaction piston 24 is apart form the stepped portion 21a of the input shaft 21 and the flange 22a of the cylindrical stopper 22 is apart form the stopper 24c of the first flange 24a and is therefore advanced from the stopper 24c.

As the braking operation is performed by pedaling the brake pedal, the input shaft 21 and the cylindrical member 20 moves forward to switch the control valve 47 as mentioned above. Therefore, the power chamber 30 is shut off from the booster reservoir 42 and is communicated with the accumulator 46 so that the pressurized fluid is introduced from the accumulator 46 into the power chamber 30. When the pressure of the pressurized fluid introduced in the power chamber 30 grows to reach a level that can overcome the spring forces of the return springs 52 and 61, the power piston 10 moves forward by the pressurized fluid so that the hydraulic booster 2 is actuated and the master cylinder piston 53 moves forward, thereby developing master cylinder pressure in the fluid chamber 57. The pressurized fluid in the power chamber 30 is introduced into the wheel cylinders 33, 34 relating to the one circuit and the master cylinder pressure is introduced into the wheel cylinders 58, 59 relating to the other circuit.

Though the reaction piston 24 is shifted to the right relative to the power piston 10 and the input shaft 21 by the fluid pressure in the power chamber 30 against the spring force of the spring 25, the rear end 24e of the reaction piston 24 never reaches to the stepped portion 21a of the input shaft 21. The fluid pressure in the power chamber 30 is introduced into the annular chamber 51 through the paths 48, 50 and is exerted on the annular stepped portion 10c of the power piston 10 in the direction opposite to the direction that the fluid pressure in the power chamber 30 is exerted on the power piston 10. The annular stepped portion 10c is a pressure receiving portion of the present invention. In this case, since the effective receiving area of the power piston 10 on which the fluid pressure in the power chamber 30 is substantially exerted is equal to the effective receiving area of the master cylinder piston 53 where the master cylinder pressure in the fluid chamber 57 is received as mentioned above while the power piston 10 and the master cylinder piston 53 are interlocked with each other through the aligning rod 62, the fluid pressure in the power chamber 30 and the master cylinder pressure balance to be equal to each other. The result is the uniformity in fluid pressure of the pressurized fluid supplied to the respective wheel cylinders 33, 34; 58, 59.

The pressurized fluid in the power chamber 30 is further introduced into the chamber 49 through the axial path 48 so that the valve body 18 is biased in the direction opposing the input force of the input shaft 21 by the fluid pressure in the chamber 49.

In the initial stage where the wheel cylinders produce substantially no braking force wherein there is play in stroke for each wheel cylinder 34, 35; 58, 59, the right end 24e of the reaction piston 24 does not come in contact with the stepped portion 21a of the input shaft 21 so that no force from the reaction piston 24 is exerted on the input shaft 21. Therefore, exerted on the input shaft 21 is force developed by the fluid pressure in the power chamber 30 and received by relatively small effective receiving areas of the cylindrical stopper 22 and the cylindrical member 20 and this force is transmitted as reaction force to a driver.

As the reaction force of the input shaft 21 becomes equal to the input force of the input shaft 21, the valve ball 17 is seated in both the first valve seat 14b and the second valve seat 20a so that the power chamber 30 is shut off from the accumulator 46 and the booster reservoir 42. As the input of the input shaft 21 further grows, the valve ball 17 is seated in the second valve seat 20a and the valve ball 17 is parted from the first valve seat 14b again so that further fluid pressure is supplied to the power chamber 30 with the result that the fluid pressure in the power chamber 30 further rises. After that, by repeating the seating of the valve ball 17 in the first valve seat 14b, as the input of the input shaft 21 grows, the fluid pressure in the power chamber 30 successively rises at the predetermined power ratio.

Since during the respective wheel cylinders 33, 34; 58, 59 are in play range of stroke, the right end 24e of the reaction piston 24 does not come in contact with the stepped portion 21a of the input shaft 21 so that the effective receiving area of the input shaft 21 on which the fluid pressure in the power chamber 30 is exerted is small and the power ratio at this point is therefore large. Accordingly, the output of the hydraulic booster 2 rises quite largely relative to the input of the input shaft 21 at the large power ratio so that the hydraulic booster 2 performs the so-called jumping action.

As the fluid pressure in the power chamber 30 further rises and the power piston 10 further moves forward so that the play in stroke for the respective wheel cylinders 33, 34; 58, 59 is canceled, the wheel cylinders 33, 34; 58, 59 produce braking forces and the brakes thereby substantially work. In this state, the right end 24e of the reaction piston 24 comes in contact with the stepped portion 21a of the input shaft 21 by the risen fluid pressure in the power chamber 30 and the reaction piston 24 exerts force on the input shaft 21 with the biasing force by fluid pressure in the power chamber 30 in such a manner as to oppose the input force of the input shaft 21. Therefore, the reaction force exerted on the input shaft 21 grows and the output of the hydraulic booster 2 rises relative to the input force of the input shaft 21 with a ratio smaller than that when the wheel cylinders are in the play range and then the jumping action is finished.

After that, since the reaction force grows, the hydraulic booster 2 boosts the input force of the input shaft 21 at a relatively small power ratio and the fluid pressure in the power chamber 30 becomes to correspond to the power ratio. Then, the pressurized fluid in the power chamber 30 is introduced into the wheel cylinders 33, 34 while the master cylinder 3 develop master cylinder pressure by the output of the hydraulic booster 2 and the master cylinder pressure is supplied to the wheel cylinders 58, 59 so that the wheel cylinders 33, 34; 58, 59 produce braking forces which are large relative to the input force of the input shaft 21 and the brakes thereby work with the braking forces.

At this point, the pressurized fluid in the power chamber 30 is also introduced into the annular chamber 51 of the hydraulic booster 2 and the fluid pressure of the annular chamber 51 is then exerted on the annular stepped portion 10c of the power piston 10 so that he fluid pressure in the power chamber 30 and the master cylinder pressure balance to be equal to each other as mentioned above. The result is the uniformity in fluid pressure of the pressurized fluid supplied to the respective wheel cylinders 33, 34; 58, 59.

As releasing the brake pedal to cancel the braking, the input shaft 21 and the cylindrical member 20 move to the right the second valve seat 20a of the control valve 47 is parted from the valve ball 17 so that the power chamber 30 communicates with the booster reservoir 42. Therefore, the pressurized fluid in the power chamber 30 is discharged into the booster reservoir 42 through the axial hole 14c of the valve seat member 14, a space between the valve ball 17 and the second valve seat 20a, the axial hole 20b of the cylindrical member 20, the axial path 35 and radial path 36 of the input shaft 21, the annular groove 37 and the radial path 38 of the plug 8, an annular space 39 between the plug 8 and the housing 4, the axial path 40 of the housing 4, and the discharge port 41. At this point, since the input shaft 21 largely retreats until the flange 22a of the cylindrical stopper 22 comes into contact with the stopper 24c of the reaction piston 24, the second valve seat 20a is largely parted from the valve ball 17. Therefore, the pressurized fluid in the power chamber 30 is rapidly discharged, thereby reducing the fluid pressure in the power chamber 30.

As a result of the discharge of the pressurized fluid in the power chamber 30, the pressurized fluid in the respective wheel cylinders 33, 34 relating to the one circuit is also rapidly discharged into the booster reservoir 42 through the power chamber 30 and the power piston 10 rapidly retreats by the spring force of the return spring 52. As a result of the retreat of the power piston 10 causes the master cylinder piston 53 also rapidly retreats so that the fluid chamber 57 of the master cylinder 3 communicates with the master cylinder reservoir 54. Therefore, the pressurized fluid in both the wheel cylinders 58, 59 relating to the other circuit is also rapidly discharged to the master cylinder reservoir 54 through the fluid chamber 57. The result is the rapid cancellation of the braking. The pressurized fluid in the annular chamber 51 is also discharged to the booster reservoir 42 in the same manner through the radial path 50, the axial path 48, and the power chamber 30.

As the fluid pressure in the power chamber 30 is reduced to the predetermined pressure, the reaction piston 24 moves forward relative to the power piston 10 and the input shaft 21 by the spring force of the spring 25 and comes in contact with the flange 14a of the valve seat member 14 while the right end 24e of the reaction piston 24 is parted from stepped portion 21a of the input shaft 21.

As the input shaft 21 further retreats until the cancellation of the braking is nearly finished, the flange 22a of the cylindrical stopper 22 comes in contact with the front end 8c of the cylindrical projection 8a of the plug 8, thereby stopping the retreat of the input shaft 21 and the cylindrical member 20. At this point, the input shaft 21 and the cylindrical member 20 are in the rearmost positions. However, even when the input shaft 21 and the cylindrical member 20 stop retreating, the power piston 10, the reaction piston 24, the valve ball 17, and the valve seat member 14 continue to retreat. Therefore, the flange 22a of the cylindrical stopper 22 is parted from the stopper 24c of the reaction piston 24 while the valve ball 17 approaches the second valve seat 20a of the cylindrical member 20.

As the right end of the power piston 10 comes in contact with the plug 8 as shown in FIG. 1 and FIG. 2, the power piston 10 stops retreating and is in the inoperative position and the master cylinder piston 53 also stops retreating and is in the inoperative position, thereby rapidly and completely canceling the braking. In this state, the valve ball 17 is very close to the second valve seat 20a so that the space between the valve ball 17 and the second valve seat 20a is so small, that is, the valve ball 17 is on the verge of sitting. Therefore, if the input shaft 21 and the cylindrical member 20 moves forward by pedaling the brake pedal, the valve ball 17 sits straight in the second valve seat 20a while the valve ball 17 is parted straight from the first valve seat 14b. That is, the play in stroke for performing the switching operation of the control valve 47 is significantly reduced, thereby rapidly actuating the brakes.

In this manner, the brakes are rapidly actuated when the braking operation is performed, while the braking is rapidly canceled when the braking operation is canceled. In short, the brake pressure-producing device 1 has excellent responsibility.

In the brake-pressure producing device 1 of this embodiment, when the braking operation is performed, the fluid pressure in the power chamber 30 introduced into the wheel cylinders 33, 34 relating to the one circuit and the master cylinder pressure introduced into the wheel cylinders 58, 59 relating to the other circuit balance to be equal to each other. The result is the uniformity in brake pressure of the respective wheel cylinders 33, 34; 58, 59. Even when a X-type piping is used in the brake system, the balanced and proper distribution of the braking forces to the wheels can be provided, thereby properly performing the braking operation.

Moreover, the housing of the hydraulic booster 2 and the housing of the master cylinder 3 are integrally formed as the housing 4, with the result that the overall length of the assembly of the hydraulic booster 2 and the master cylinder 3 can be shortened and the number of parts can be reduced. This simplifies the structure of the assembly and reduces the cost.

Figure 4:
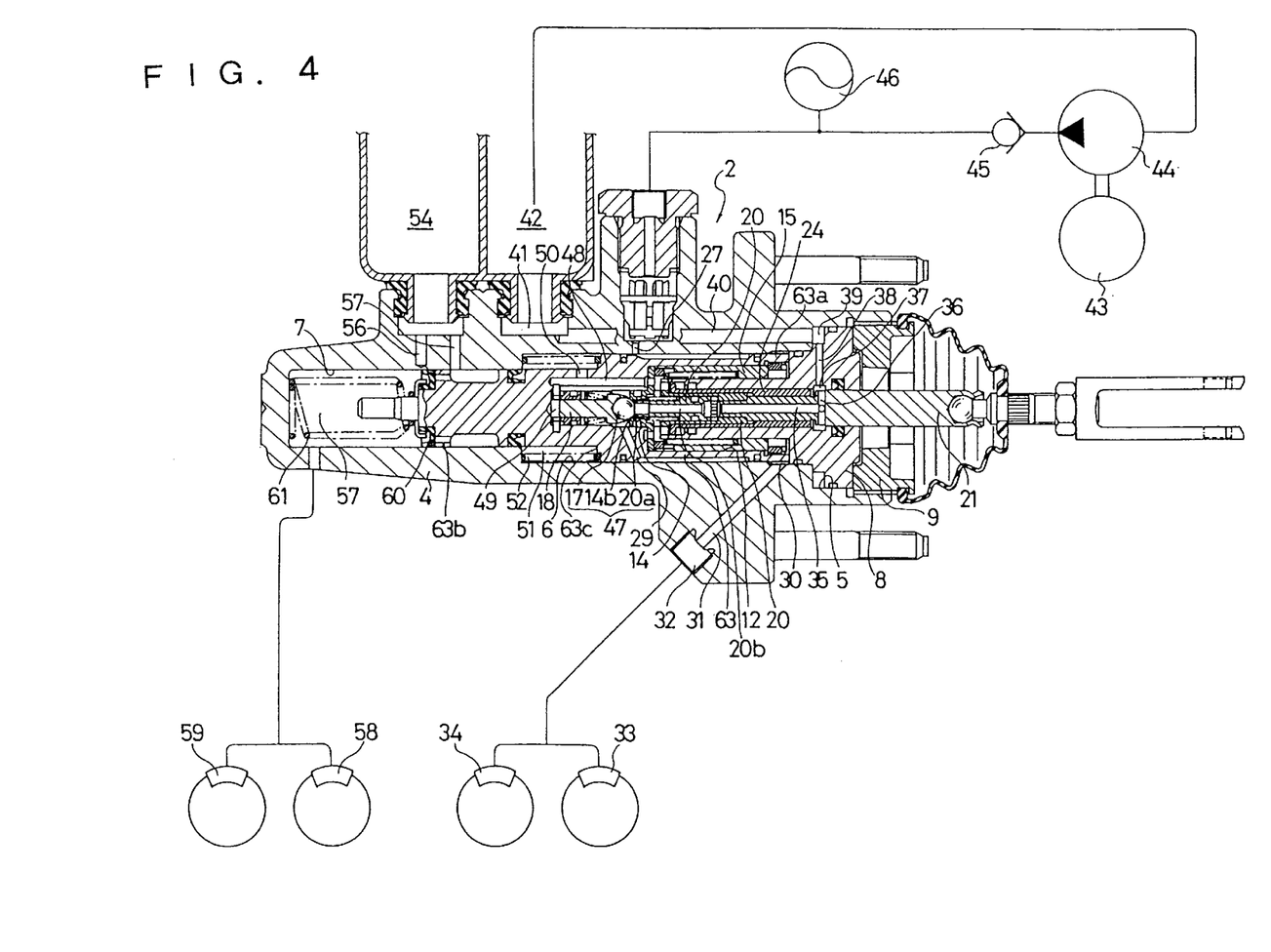
FIG. 4 is a sectional view similar to FIG. 1 showing another embodiment of the present invention.

FIG. 4 is a view similar to FIG. 1 showing another embodiment of the present invention. It should be noted that parts similar or corresponding to the parts of the brake-pressure producing device 1 shown in FIG. 1 will be marked by the same reference numerals so that the description about the parts will be omitted and parts not marked are the corresponding parts of the device shown in FIG. 1.

Though the power piston 10 and the master cylinder piston 53 are formed separately and are interlocked with each other through the aligning rod 62 in the embodiment shown in FIG. 1, the power piston and the master piston are integrally formed as one stepped piston 63 comprising a large-diameter portion 63a, a small-diameter portion 63b, and an annular stepped portion 63c as shown in FIG. 4 in this embodiment. In this case, the fluid pressure of the annular chamber 51 is exerted on the stepped portion 63c. The other components of the brake-pressure producing device 1 are the same as the embodiment shown in FIG. 1 and FIG. 2.

Since the power piston and the master cylinder piston are integrally formed in the brake-pressure producing device 1 of this embodiment, the aligning rod is not required. This can further shorten the overall length of the assembly of the power piston and the master cylinder piston and further reduce the number of the parts, thereby further simplifying the structure of the assembly and reducing the cost.

The other functions and effects of the brake-pressure producing device 1 of this embodiment are the same as the embodiment shown in FIG. 1 and FIG. 2.

Though the present invention is applied to the brake pressure-producing device being of such a type that the control valve is built in the power piston in the above embodiments, the present invention can be applied to a brake pressure-producing device being of such a type that a control valve is disposed out of a power piston as disclosed in the aforementioned publication.

As apparent from the above description, in the brake-pressure producing device according to the present invention, when the braking operation is performed, the fluid pressure in the power chamber introduced into the wheel cylinders relating to the one circuit and the master cylinder pressure introduced into the wheel cylinders relating to the other circuit balance to be equal to each other. The result is the uniformity in brake pressure of all the wheel cylinders. Even when a X-type piping is used in the brake system, the balanced and proper distribution of the braking forces to the wheels can be provided, thereby properly performing the braking operation.

In addition, according to the present invention, the housing of the hydraulic booster and the housing of the master cylinder and/or the power piston and the master cylinder piston are integrally formed, with the result that the overall length of the assembly of the hydraulic booster and the master cylinder can be shortened and the number of parts can be reduced. This simplifies the structure of the assembly and reduces the cost.

What we claim is:

1. A brake-pressure producing device for two circuits comprising:

an input shaft which is operated when braking operation is performed;

a hydraulic booster having a control valve controlled by said input shaft, a power chamber into which the fluid pressure is introduced when the braking operation is performed and which communicates with brake cylinders relating to one of said two circuits, and a power piston which is actuated by the fluid pressure in said power chamber, the fluid pressure being discharged from said power chamber by said control valve when the braking operation is not performed, the fluid pressure being introduced into said power chamber when the braking operation is performed, the fluid pressure introduced into said power chamber being then introduced into the brake cylinders relating to said one circuit, and the hydraulic booster outputting according to the operation of the power piston by the fluid pressure in said power chamber; and a master cylinder having a master cylinder piston which is interlocked with said power piston by the output of said hydraulic booster, said master cylinder developing master cylinder pressure by the operation of the master cylinder piston and supplying the master cylinder pressure to brake cylinders relating to the other one of said two circuits, wherein said power piston comprises a stepped piston including a large-diameter portion at one end on which the fluid pressure of said power chamber is exerted and a small-diameter portion at the end opposite to the end of the large-diameter portion, said small-diameter portion having the same diameter as said master cylinder piston, an annular stepped portion between said large-diameter portion and said small-diameter portion is a pressure receiving area on which the fluid pressure of said power chamber exerted in the direction opposite to the direction that the fluid pressure is exerted on the end of said large-diameter portion.

2. A brake-pressure producing device as claimed in claim 1, wherein said housing of said hydraulic booster and the housing of said master cylinder and/or said power piston and said master cylinder piston are integrally formed.

* * * * *